April 17, 1962 M. W. LEE 3,029,724
PRESSURE COOKER AND SMOKER
Filed July 13, 1959

MAURICE W. LEE
INVENTOR.

BY Loyal J. Miller
ATTORNEY

United States Patent Office 3,029,724
Patented Apr. 17, 1962

3,029,724
PRESSURE COOKER AND SMOKER
Maurice W. Lee, Box 188, Boley, Okla.
Filed July 13, 1959, Ser. No. 826,685
1 Claim. (Cl. 99—260)

The present invention relates to cooking utensils and more particularly to an aromatic pressure cooker wherein wood smoke or other aromatic flavors may be impregnated in foods being cooked under pressure.

The principal object of this invention is to provide a pressure cooking vessel having means in its bottom surface for containing and vaporizing a quantity of water and charring a food flavoring substance.

Another object is to provide a pressure cooker which may be heated for cooking foodstuffs over a gas, or alcohol flame or an electric heating element, wherein the heat may be concentrated in a relatively small area of the bottom portion of the vessel to develop a temperature sufficient to char a wood flavoring substance and generate smoke.

Another object is to provide a pressure cooker for barbecuing foods which uses a relatively small amount of heat activated substances for cooking and flavoring the foodstuffs.

A further object is to provide a pressure cooker wherein the walls, forming the vessel, are relatively thick and wherein the bottom is provided with a section of relatively thin metal which will permit concentration of heat to the interior of the vessel.

Still another object is to provide a pressure cooker of this type which is rigid in construction and which may be easily cleaned and will have a comparatively long useful life.

The present invention accomplishes these and other objects by providing an upwardly open container, having a relatively thick side wall and bottom, and wherein an opening is provided in the bottom and surrounded by an upstanding flange. A relatively thin disk is embedded in the wall of the bottom, defining the opening for forming, in co-operation with the flange, a relatively shallow upwardly open well for receiving water and food flavoring substances. A cover means is removably connected with the container for sealing the latter.

Figure 1:
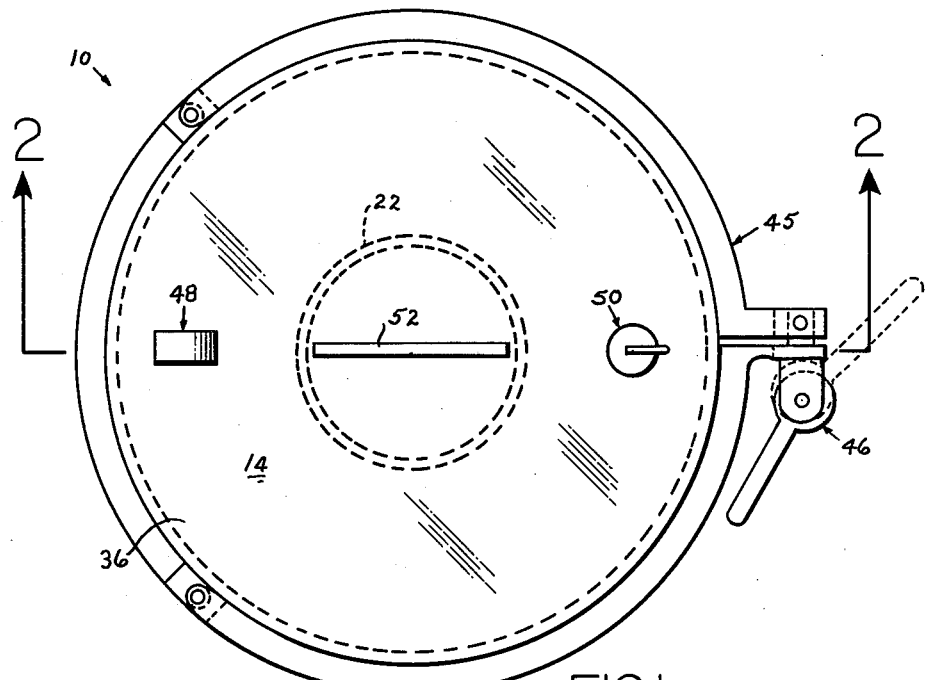
Figure 2:
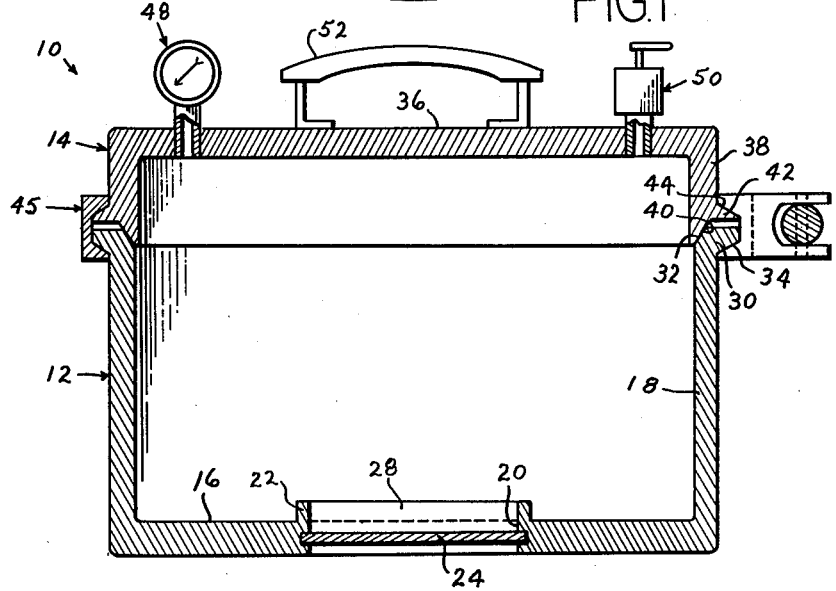

Other objects will be apparent from the following description when taken in conjunction with the accompanying single sheet of drawings, wherein:

FIGURE 1 is a top plan view of the device; and,
FIGURE 2 is a vertical cross-sectional view taken substantially along line 2—2 of FIG. 1.

Like characters of reference designate like parts in those figures of the drawings in which they occur.

In the drawings:
The reference numeral 10 indicates the device, as a whole, which is cylindrical in general configuration and includes an upwardly open container 12 closed by a lid means 14. The container 12 has a horizontal bottom 16 and an integral vertical side wall 18 both formed of relatively thick metallic material, preferably aluminum, but which may be formed of any desired material. The bottom 16 is centrally provided with a circular opening 20 and an integral upstanding flange 22 surrounding the opening. The height of the flange is not critical but is relatively short and in the example shown is of less height than the vertical thickness of the bottom 16.

A relatively thin disk or plate 24 has a portion of its peripheral edge embedded within the wall of the bottom defining the opening 20 between the opposing upper and lower limits of the bottom 16 thus forming, with the flange 22, a relatively shallow upwardly open well 28 within the container for the purposes which will presently be explained.

The upper or top edge of the container 12 is provided with a horizontal flange 30 having an outwardly and upwardly beveled inner surface 32 and an outer upwardly beveled surface 34.

The lid means 14 is similarly formed of metallic material and includes a horizontal top surface 36 and a depending wall 38. The depending edge of the lid wall 38 is provided with a downwardly inclined surface 40 adapted to be cooperatively received in contiguous contact by the container surface 32. The depending edge of the lid is further provided with an outwardly projecting flange 42 having an outer downwardly inclined surface 44. Pivotally connected circular arc, substantially U-shaped, clamping means 45 surrounds and contiguously contacts the beveled surfaces 34 and 42 for sealing the lid with the container by means of a lever operated cam 46. A pressure gauge 48 and safety valve 50 are each connected with the lid for communication with the interior of the container through suitable apertures. A handle 52 is connected to the top surface 36 for removing the lid.

*Operation*

In operation a quantity of food flavoring substance, such as dry hickory wood chips or shavings, not shown, is placed within the wall 28 with a selected quantity of water, not shown. For example, approximately one ounce of hickory wood and one tablespoonful of water is used for each twelve pounds of meat to be cooked and flavored. The water may be included with the wood by soaking the latter in water for a period of ten minutes to one-half hour. The meat, not shown, is placed within the container on the bottom 16 around the well 28 or, if desired, the meat may be supported in spaced relation with respect to the container bottom as by a rack, not shown. After sealing the lid with the container, the bottom plate 24 is positioned over suitable heating means such as a gas flame or electric hot plate. The heating element vaporizes the water for pressure cooking the meat or foodstuff and chars the wood which imparts a hickory smoke flavor to the meat. Thus it may be seen that the relatively thin plate 24 permits rapid heating of the elements placed within the well 28 to a high degree of temperature while the relatively thick container bottom prevents burning the foodstuff during the time required for properly cooking the latter.

Obviously the invention is susceptible to some change or alteration without defeating its practicability, and I therefore do not wish to be confined to the preferred embodiment shown in the drawings and described herein, further than I am limited by the scope of the appended claim.

I claim:
A pressure cooker and smoker, comprising: an upwardly open metallic container having a relatively thick bottom and side wall, said bottom having a central circular opening defined by a vertical wall, said vertical wall being provided with an annular recess intermediate the thickness of said bottom, said bottom having a relatively narrow integral upstanding flange surrounding the opening, the height of said flange being less than the thickness of said bottom; a relatively thin horizontal metallic plate of dissimilar material having its peripheral edge and a circumferential portion of its upper and lower surface adjacent its peripheral edge closely received within the annular recess in the wall of said bottom defining the opening for forming, with said flange, an upwardly open water and food flavoring receiving well within the container; and removable cover means for sealing the open end of said container.

References Cited in the file of this patent

UNITED STATES PATENTS

| | | |
|---|---|---|
| 913,293 | Holley | Feb. 23, 1909 |
| 1,175,858 | Wojidkow | Mar. 14, 1916 |
| 1,444,043 | Slocomb | Feb. 6, 1923 |
| 2,402,997 | Grayson | July 2, 1946 |
| 2,493,903 | Thomas | Jan. 10, 1950 |
| 2,571,782 | Swenson | Oct. 16, 1951 |